United States Patent [19]
Brewer

[11] 3,908,848
[45] Sept. 30, 1975

[54] REFUSE COLLECTING AND DISPENSING VEHICLE

[75] Inventor: Willie F. Brewer, Clarion, Iowa

[73] Assignee: Hagie Manufacturing Company, Clarion, Iowa

[22] Filed: June 21, 1974

[21] Appl. No.: 481,640

[52] U.S. Cl. .................... 214/508; 214/83.3; 193/4
[51] Int. Cl.² ........................................ B60P 1/28
[58] Field of Search .......... 214/505, 501, 508, 509, 214/82, 83.3, 510; 193/4, 5, 6; 298/1 B

[56] References Cited
UNITED STATES PATENTS
1,455,714  5/1923  Dailey ................................ 193/4 X
3,542,225  11/1970  Knight ............................... 214/508

Primary Examiner—Albert J. Makay
Attorney, Agent, or Firm—Rudolph L. Lowell

[57] ABSTRACT

The vehicle has a self-propelled main frame with a box pivotally mounted at its rear end on the frame for upward movement of its front end to a box dumping position. The box has a forward charging opening. A packer means is swingable through the charging opening and rearwardly of the box toward a rear discharge opening that is normally closed by a cover means. The cover means has depending side wings which coact with an adjustable chute means, mounted rearwardly of the discharge opening, to confine and direct refuse into a dumping area or hopper. The packer means is operated through a hydraulically actuated linkage system which provides for the application of a high uniform pressure on the packer means throughout its rearward travel within the box.

6 Claims, 6 Drawing Figures

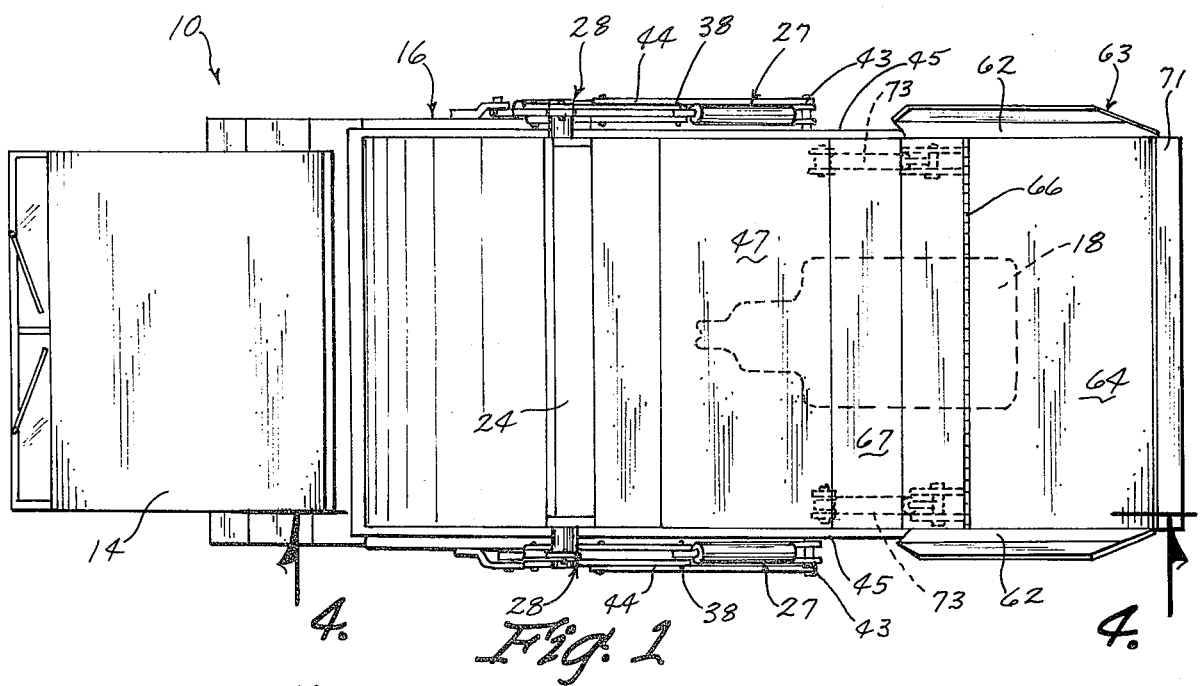
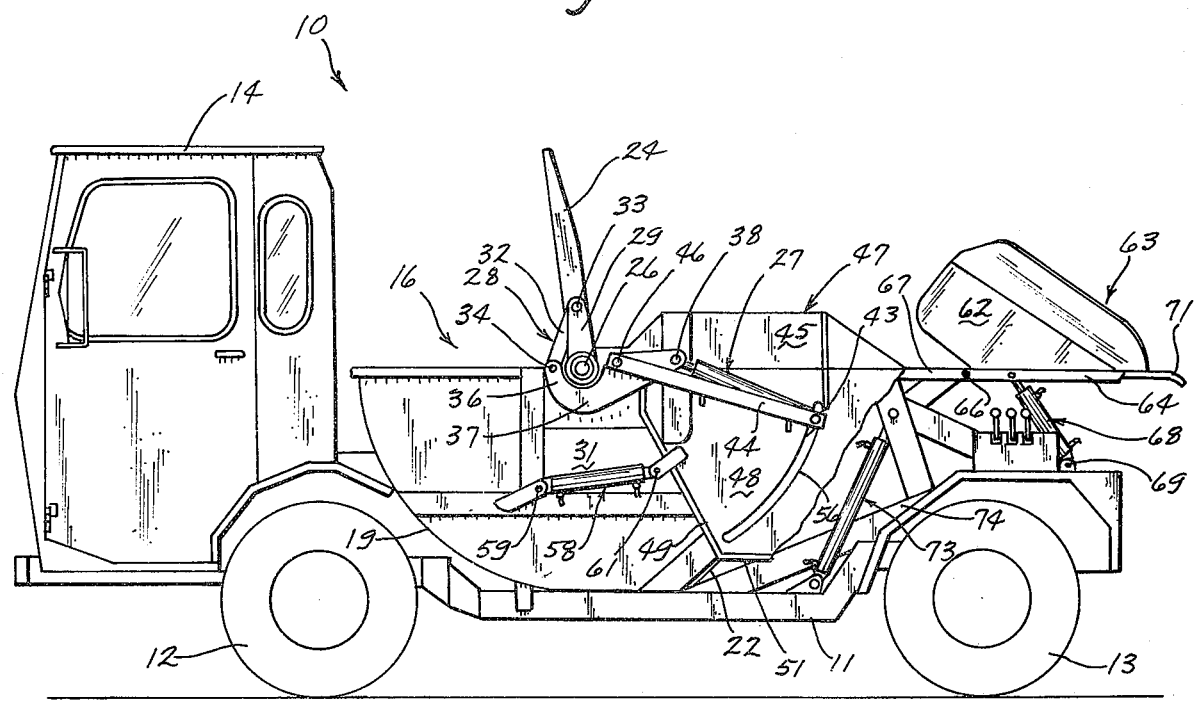
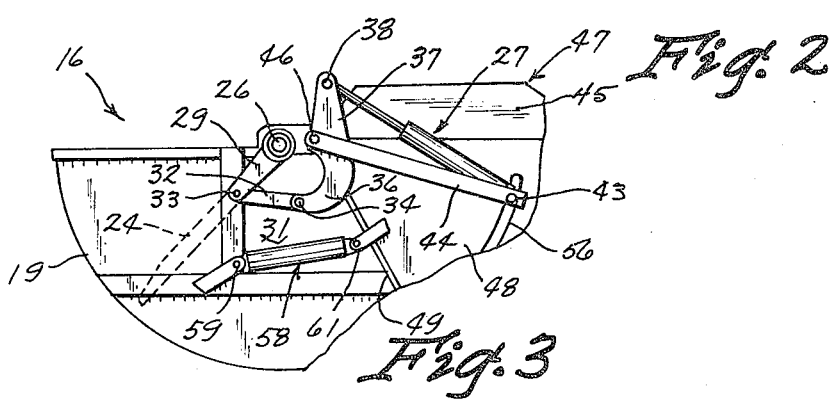

U.S. Patent  Sept. 30,1975  Sheet 2 of 2  3,908,848
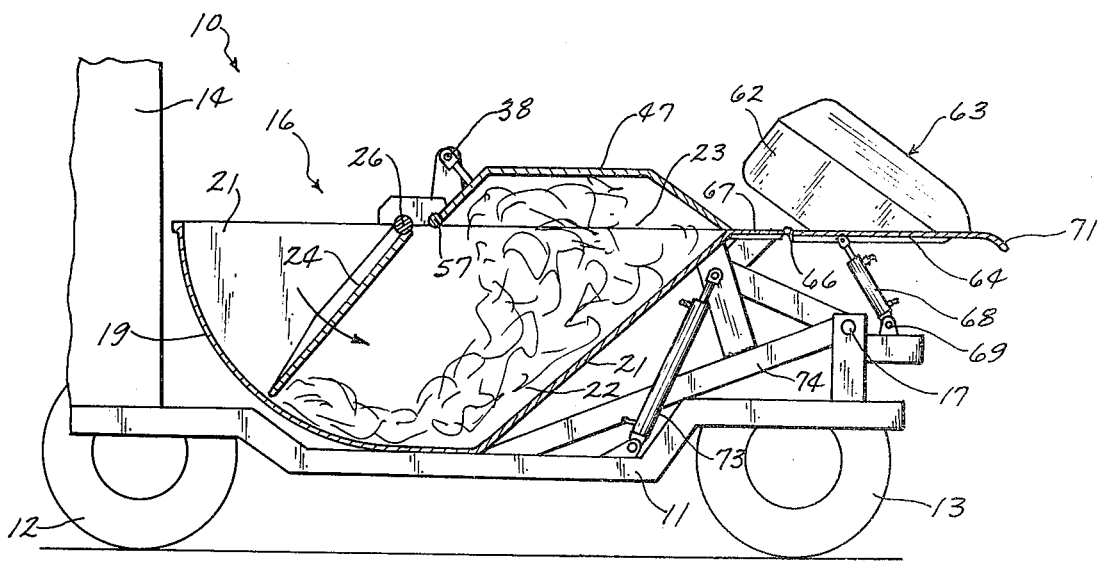
Fig.4
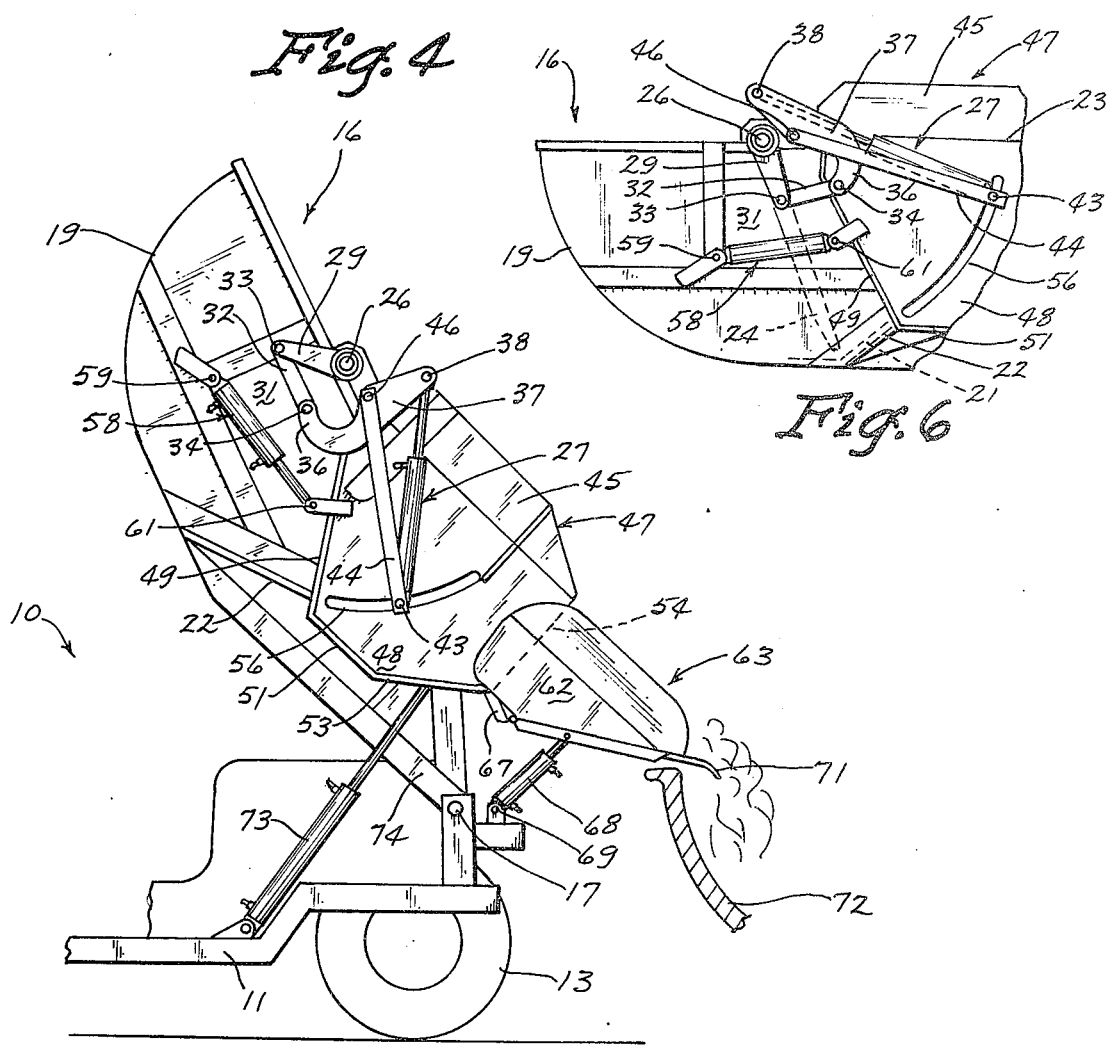
Fig.5
Fig.6

REFUSE COLLECTING AND DISPENSING VEHICLE

SUMMARY OF THE INVENTION

The refuse collecting and dispensing vehicle of this invention is of a compact and rugged construction and efficient in operation to collect refuse from confined areas, compact the same, and then dispense the refuse into a main truck for transport to a municipal dump or the like. The side wings on the cover for the discharge opening of the vehicle box, in conjunction with the discharge chute on the box, prevents any refuse from dropping to the ground during a vehicle to truck transfer operation so as to eliminate littering of driveways and streets. Additionally, a uniformly high compressive pressure is applied on the collected refuse by the packer means so that the vehicle is capable of picking up refuse from a large number of homes whereby to reduce to a minimum the number of unloading trips made to a main receiving truck during a refuse pick-up operation. All operating parts of the vehicle, such as the transmission, engine and oil pump unit, are readily accessible for servicing when the vehicle box is in a dumping position.

BRIEF DESCRIPTION OF THE DRAWINGS

FIG. 1 is a top view of the vehicle of this invention;

FIG. 2 is a side elevational view of the vehicle shown in loading position and with some parts broken away to more clearly show its construction;

FIG. 3 is a detail elevational view showing the packer means positioned within the vehicle box;

FIG. 4 is a sectional view taken along line 4—4 in FIG. 1;

FIG. 5 is a side elevational view showing the vehicle box in a dumping position with the packer means moved within the box to the position thereof shown in FIG. 3; and FIG. 6 is a detail elevational view showing the packer means in the rearmost position thereof.

DETAIL DESCRIPTION OF THE INVENTION

Referring to FIGS. 1 and 2 of the drawings, the vehicle of this invention, indicated generally as 10, is illustrated as including a portable or main frame 11 equipped with front steering wheels 12 and rear traction wheels 13. An operator's cab 14 is located forwardly of the front wheels 12 and a refuse collection box 16 is mounted on the frame between the front wheels and rear wheels 13. The box 16 has its rear end pivotally supported at 17 (FIG. 4) on the main frame 11 for up and down pivotal movement to dumping and loading positions therefor. An engine 18 (FIG. 1) for the vehicle 10 is mounted on the frame rearwardly of the box 16, and is equipped with an oil pump unit (not shown) for supplying oil under pressure to hydraulic mechanisms to be later described.

The box or receptacle 16 (FIG. 4) has a downwardly and rearwardly curved front section 19 provided with an upwardly facing charging opening 21. The rear section 22 of the box is inclined upwardly and rearwardly and has an upwardly presented discharge opening 23. A packer unit 24, for compressing refuse material collected in box 16, is pivotally supported on a transverse pivot or rock shaft 26 located at the rear edge of the charging opening 21 for pivotal movement from its upright position, shown in FIG. 2, providing for the reception of material within the charging opening 21, for movement downwardly through the opening 21 and rearwardly of the box 16 and toward the discharge opening 23 to a rearmost position shown in FIG. 6. The packer unit 24 is actuated by a pair of hydraulic cylinder assemblies 27 (FIG. 1) and corresponding linkage assemblies 28 arranged at opposite sides of the box 16.

Each linkage assembly 28 (FIG. 2) is of a like construction and operation and includes a rock arm 29 carried at an end of the rock shaft 26 for rocking movement in a path to the outside of an adjacent side wall 31 of the box 16. A connecting link 32 has one end pivotally connected at 33 to the free end of the rock arm 29. The opposite end of a connecting link 32 is pivotally connected at 34 to one end 36 of a second link or bell crank 37. The opposite end of the bell crank 37 is pivotally connected at 38 to one end of a cylinder assembly 27. The other end of the cylinder assembly 27 is pivotally supported at 43 on a box side wall 31. A guide rod or link 44 has a forward end pivoted at 46 to the bell crank 37 at a position intermediate the ends thereof and a rear end pivotally mounted on the cylinder pivot support 43.

As shown in FIG. 2, that portion of the bell crank 37 located between the pivots 34 and 46 is of an arcuate shape so as to be positioned in a substantially concentric relation about the lower side of the rock shaft 26 when the packing unit 24 is in the upright position thereof shown in FIG. 2. In this upright position of the packing unit it is seen that the pivots 34 and 46 are positioned for and aft, respectively, of the rock shaft 26 with their axes located in a plane extended substantialy through the axis of the rock shaft 26. On extension of the cylinder assembly 27, the bell crank 37 is rotated in a counterclockwise direction relative to the pivot 46 as viewed in FIGS. 2 and 3. As the packer unit 24 approaches its horizontal position, shown in FIG. 3, the included angle between the connecting link 32 and rock arm 29 is progressively increased. Thus, during the travel of the packer unit within the box 16 from its position in FIG. 5 to the position therefor shown in FIG. 6, a maximum leverage force is applied on the rock arm 29 in response to the rotational movement of the bell crank 37 about the pivot 46. During this movement of the packer unit it is to be noted that the pivot 46 is retained in a substantially constant position relative to the axis of the rock shaft 26 by the guide action of the rod 44.

The rear discharge opening 23 is normally closed by a cover means 47, of a generally inverted box shape, the transversely opposite side walls 45 of which are provided with downwardly depending side wings 48 that straddle the rear section 22 of the box 16. The side wings 48 (FIGS. 5 and 6) are of an irregular shape having a downwardly and rearwardly inclined front edge 49, a linear bottom edge 51 and a rear edge formed with a rearwardly and upwardly inclined lower section 53 and an upper upright linear section 54.

Each side wing 48 is of a height substantially equal to the depth of the box 16 and is formed with an arcuate slot 56 generated about the axis of a transverse pivot 57 (FIG. 4), located adjacent the forward edge of the discharge opening 23 and pivotally supporting the cover means 47 for movement to open and closed positions therefor. A pivotal support 43 for a cylinder assembly 27 and guide rod 44 extends through a slot 56. Each side wing 48 is operatively associated with a cylinder assembly 58 having a forward end pivoted at 59 on a side wall 31 of the box 16 and a rear end pivoted at 61 to a side wing 48.

When the box is in a dumping position thereof, shown in FIGS. 5 and 6, movement of the cover 47 to open the discharge opening 23 moves the side wings 48 into coacting positions with the side members 62 of an adjustable chute unit 63 to direct refuse material from the opening 23 for travel along a confined path to a dumping zone located rearwardly of the vehicle 10. The chute unit 63 (FIG. 4) includes a base or floor member 64 which is hingedly connected for up and down pivotal movement at 66 to the rear edge of a shelf member 67 that projects laterally rearwardly from the rear edge of the discharge opening 23. A cylinder assembly 68 pivotally connected at one end to the underside of the floor member 64 and at its opposite or lower end 69 to the main frame 11 pivotally adjusts the chute unit 63 relative to the pivot 66 into cooperative relation with the side wings 48 of the cover 47. The chute side members 62 are transversely spaced a distance apart (FIGS. 1 and 5) to receive the side wings 48 therebetween. The chute unit 63 projects rearwardly of the main frame 11 (FIGS. 5 and 6) so that in a dumping operation the rear end 71 of the chute floor member 64 can be positioned to overhang the side wall of a receiving bin or hopper 72 on the main truck (not shown) with which the vehicle 10 functions as a satellite unit.

It is seen, therefore, that the side wings 48 of the cover 47 and side members 62 of the chute 63 form with the shelf 67 and floor member 64 a continuous confined path from the discharge opening 23 to the hopper 72 whereby to prevent the falling of refuse to the ground during a vehicle unloading operation. Tilting movement of the box 16 to the loading and dumping positions therefor is accomplished by a pair of hydraulic cylinder assemblies 73 interconnected between the main frame 11 (FIGS. 2 and 4) and a rear frame extension 74 for the box 16. As best shown in FIG. 2, a control valve unit for the cylinder assemblies 27, 58, 68 and 73 is conveniently located at the rear end of the main frame below the chute unit 63 for convenient accessibility to the vehicle operator at a position wherein he has an unobstructed view of the dumping operation.

Although the invention has been described with respect to a preferred embodiment thereof, it is to be understood that it is not to be so limited since changes and modifications can be made therein which are within the full intended scope of this invention as defined by the appended claims.

I claim:

1. A refuse collecting and dispensing vehicle comprising:
   a. a portable frame having a forward end and a rear end,
   b. a refuse carrying receptacle on said frame having an upwardly presented charging opening adjacent said forward end and a discharge opening at said rear end,
   c. a pivoted cover means for normally closing said discharge opening,
   d. a packer swingably mounted about a transverse axis at the rear edge of said charging opening and swingable downwardly through said opening and rearwardly toward said cover means to urge the refuse in the receptacle toward and compress the same against said cover means,
   e. pivot means supporting said receptacle at the rear end of said frame for upward and rearward pivotal movement of the receptacle to a refuse dumping position,
   f. a chute means,
   g. coacting means on said cover means and chute means to form continuous side members for confining therebetween the refuse discharged from said discharge opening,
   h. means adjustably supporting said chute means on said receptacle at a position rearwardly of said discharge opening, and
   i. means for removing said chute means to an adjusted position relative to said discharge opening, when said receptacle is in a dumping position, to dispense refuse from the discharge opening to a refuse receiving station spaced rearwardly from and below the rear end of said receptacle.

2. The refuse collecting and dispensing vehicle according to claim 1 including:
   a. a pivot means for said cover means extended transversely of said receptacle at the forward edge of said discharge opening, said coacting means including a pair of depending side wings on said cover means spaced transversely of said receptacle to receive the rear end portion of said receptacle therebetween, when the cover means is in the normally closed position thereof,
   d. said side wings, when the receptacle is in the dumping position and the cover means is in the open position therefor, forming upright side extensions for said receptacle to confine the refuse from the discharge opening for flow onto said chute means.

3. The refuse collecting and dispensing vehicle according to claim 2 wherein:
   a. said coacting means includes a pair of upstanding side members on said chute means transversely spaced a distance apart to receive therebetween the depending side members of said cover means during a refuse dispensing operation.

4. The refuse collecting and dispensing vehicle of claim 3 including:
   a. a shelf on said receptacle projected rearwardly from the rear edge of said discharge opening, and
   b. said adjustable supporting means includes a transverse pivot means pivotally connecting the forward end of said floor member to the rear edge of said shelf whereby said shelf and floor member form a continuous floor assembly from the discharge opening to the rear end of said chute means.

5. The refuse collecting and dispensing vehicle according to claim 1 including:
   a. means for moving the packer means comprising a linkage assembly having a first link pivotally connected at one end thereof to the packer means at a position radially spaced from said transverse axis,
   b. a second link of a longer length than said first link,
   c. first pivot means connecting together adjacent ends of said first link and second link,
   d. a guide link,
   e. second pivot means pivotally supporting one end of said guide link on a side wall of said receptacle at a position rearwardly and downwardly from said transverse axis, f. third pivot means connecting the other end of said guide link to said second link intermediate the ends thereof, g. a hydraulic cylinder assembly pivotally connected at one end to said second pivot means, and h. a fourth pivot means pivotally connecting the other end of said cylinder assembly to said second link at the end thereof remote from said first pivot means.

6. The refuse collecting and dispensing vehicle according to claim 5 wherein:

a. said first link, when the packer means is projected upwardly from said transverse axis, extended forwardly and downwardly from said one end thereof, and said second link extended substantially horizontally with said first pivot means and second pivot means arranged adjacent the front side and rear side, respectively, of said transverse axis.

* * * * *